United States Patent [19]
Berman

[11] Patent Number: 5,927,987
[45] Date of Patent: Jul. 27, 1999

[54] INTERACTIVE MODULAR EDUCATIONAL SYSTEM

[76] Inventor: Margo R. Berman, 3351 NE. 164 St., N. Miami Beach, Fla. 33160

[21] Appl. No.: 09/002,155

[22] Filed: Dec. 31, 1997

[51] Int. Cl.⁶ .................................................. G09B 19/18
[52] U.S. Cl. ........................... 434/107; 434/172; 273/302
[58] Field of Search ..................................... 434/403, 365, 434/171, 172, 156, 157, 107; 273/302, 292

[56] References Cited

U.S. PATENT DOCUMENTS

| | | |
|---|---|---|
| 1,516,798 | 11/1924 | Striker . |
| 1,587,391 | 6/1926 | McKee . |
| 2,230,699 | 2/1941 | Schulze . |
| 2,322,113 | 6/1943 | Connelly . |
| 3,719,801 | 3/1973 | Drexler . |
| 3,823,492 | 7/1974 | Allain ............................................ 35/35 |
| 4,008,527 | 2/1977 | Zegel . |
| 4,109,918 | 8/1978 | Mele et al. . |
| 4,363,628 | 12/1982 | Kirkpatrick et al. . |
| 4,419,080 | 12/1983 | Erwin ....................................... 434/172 |
| 5,056,792 | 10/1991 | Helwig-Larsen et al. . |
| 5,607,309 | 3/1997 | Finn . |
| 5,645,280 | 7/1997 | Zelmer ..................................... 273/256 |

*Primary Examiner*—Jessica J. Harrison
*Assistant Examiner*—David A. Fleming

[57] ABSTRACT

An interactive modular educational system. This invention provides for an interactive modular educational system comprised of a deck of visually-enhanced cards designed to allow users to learn important business-related techniques, tactics, and strategies. The cards, divided into sections based upon different business principles, utilize color schemes, similarly sounding word endings, acronyms, and clever sketches to allow the user to learn or improve upon a variety of business disciplines. The system, which can be used randomly, modularly, or sequentially, provides an easy-to-use, easy-to-understand method of learning and remembering valuable business techniques.

8 Claims, 3 Drawing Sheets

INTERACTIVE MODULAR EDUCATIONAL SYSTEM

TECHNICAL FIELD

This invention generally relates to an interactive modular educational system and this invention particularly relates to an easy-to-understand modular educational system of visually-enhanced cards designed to provide easy-to-remember, helpful techniques and useful strategies to those in the business industry by utilizing colors, common sounding suffixes, clever sketches, and catchy acronyms.

BACKGROUND OF THE INVENTION

In the business education industry, traditional educational tools have often been presented in the form of games, books, manuals, and self-instructional tapes. These methods usually fall short of supplying the user with a thorough understanding of the material being presented, due to the repetitive, common-place nature of the medium in which it is presented. Boredom is usually the result. While games have been proposed as a means to educate and train those in a particular business discipline, they have often fallen short of the mark due to the elements of luck and limited scope of the game. Books, manuals, and instructional tapes all provide adequate means to educate, but these traditional methods often remind the user of conventional modes of learning associated with formal schooling, leading to preconceived notions of anxiety, indifference, and intimidation. There is therefore a need in the industry for an effective educational system covering a variety of business disciplines, and utilizing a method that can allow students and professionals in the industry to quickly and easily acquire and sharpen their business skills.

Previous attempts have been made to provide an educational method or apparatus designed to teach business skills such as are described in U.S. Pat. No. 5,607,309 to Finn (the '309 patent); U.S. Pat. No. 5,056,792 to Helwig-Larsen et al. (the '792 patent); U.S. Pat. No. 4,363,628 to Kirkpatrick et al. (the '628 patent); U.S. Pat. No. 4,109,918 to Mele et al.(the '918 patent); U.S. Pat. No. 4,008,527 to Zegel (the '527 patent); U.S. Pat. No. 3,719,801 to Drexler (the '801 patent); U.S. Pat. No. 2,322,113 to Connelly (the '113 patent); U.S. Pat. No. 2,230,699 to Schulze (the '699 patent); U.S. Pat. No. 1,587,391 to Mckee (the '391 patent); and U.S. Pat. No. 1,516,798 to Striker (the '798 patent), all of which are incorporated herein by reference.

The '309 patent describes an instructional apparatus and method for teaching data collection and analysis. The instructional method involves collecting and recording the collectable data, translating the data to show patterns in the data, and interpreting the data patterns.

The '792 patent describes a business education model simulating the running of a company. A game board is used representing business premises and tokens are used to represent values of raw materials and goods, each value represented by a different color.

The '628 patent describes a device and method of training bank personnel by simulating bank procedures. Game board instructions direct players to stacks of question and answer cards. Chance means such as dice and another of marking a player's position on the board are utilized.

The '918 patent describes a learning and earning educational game utilizing a game board with zones that each represent a different discipline of learning, a roulette-type spinning wheel directing players around the board, and question and answer cards. Financial instruments are also included such as play money, bonds, and checks.

The '527 patent discloses a teaching aid for demonstrating the rudimentary principles of double-entry accounting. Transaction cards having windows and accounting indicia of varying colors or designs are used in conjunction with two rotatably attached disks and with numerals. The disks and can be rotated by hand to display different numerals through the windows and the entire assembly can be posted in various ledger pages.

The '801 patent describes a selection and correlation apparatus utilizing transaction cards with accounting indicia thereon representing part of an accounting entry. Item cards with symbols representing different securities and quality cards with windows that overlay the item card to allow certain symbols to show through are utilized. If a particular security meets the qualifications of the quality card, its corresponding symbol will appear through the window. The apparatus can be used to select and analyze items such as securities, relationships between temperature and humidity, and the like.

The '113 patent describes a card game which assists those in the sales industry to better sell their products. Different categories of cards, such as decision cards, which indicate the decisions normally made when selling or purchasing a product or service, objection cards indicating obstacles standing in the way of a sale, and answer cards corresponding to ways in which the obstacles can be overcome, are dealt to the players who make decisions according to their respective cards whether or not they should follow through with the purchase of a particular product or service.

The '699 patent describes a game board using tokens representing money to be used as a means to budget a family's income in lieu of traditional bookkeeping.

The '391 patent discloses an accounting game comprised of ledger sheets bearing accounting indicia, namely debits and credits, and cards bearing similar indicia corresponding to the indicia on the ledger sheets, allowing players to attempt to develop and balance a commercial account.

The '798 patent discloses a game apparatus which simulates the buying and selling of commodities and is comprised of a deck of cards each of which represents different raw materials, manufactured articles, and margins of profit.

In addition to the above patents, "The Creative Edge" is another attempt to provide an educational method or apparatus designed to teach business skills. This publication, incorporated herein by reference, utilizes acronyms as a device to describe different business skills; however, it does not use additional techniques such as color schemes, matching suffixes, sketches that are specifically designed to portray the business discipline described by the letter of the acronym, or cards which allow for a modular rather than linear system of learning.

Other publications, such as "THINKPAK" and "Creative WhackPack", also incorporated herein by reference, also describe attempts to educate business people. "THINKPAK" is a deck of cards designed to assist users in problem solving. It uses only one acronym, namely "SCAMPERR", which is a principle of learning. It does not, however, use sketches, only mere abstract designs, nor does it use similar sounding suffixes, or a plurality of acronyms, all of which more clearly educate business people. "Creative WhackPack" uses pictures and text to help the user increase creativity, but does not incorporate acronyms or color schemes.

None of the previous efforts mentioned above either alone or in conjunction, describes an interactive modular educational system teaching business skills utilizing cards, color schemes, sketches, and suffixes.

Consequently, there is a need in the art for an interactive modular educational system to allow users to learn fundamental business principles in an easy-to-understand manner, and more importantly to allow users to remember these principles by associating important business techniques and hints with specific colors, sketches, and easy-to-remember acronyms.

There is a further need in the art for an educational system that can be used as a system, in particular a modular system, capable of being used sequentially (in order), modularly (by segments), or randomly (mixing cards from different business disciplines).

There is a further need in the art for an educational system which allows the users, if they prefer, to learn only a segment of a business discipline, or to learn several different disciplines without spending unnecessary time as you would playing an entire game.

SUMMARY OF THE INVENTION

The present invention which can be used as a portable library by providing a different deck for one of seven separate business disciplines, each in a deck-of-cards format, solves significant problems in the art by providing an interactive modular educational system utilizing techniques which keep users interested by helping them to better retain and recall the skills taught to them.

Generally, the present invention is an interactive modular educational system comprised of a plurality of principle cards each having a front side and a back side. The principle card is represented by a color different from the color of a prior or succeeding principle card thereby providing a color scheme for the purpose of allowing a user to associate a particular color with a particular principle word. There are a plurality of principle words written upon the front side of one of the principle cards and upon a series of strategy cards succeeding one of the principle cards and preceding one of the principle cards upon which a different principle word is written. A plurality of phrases, each of which represent a tactic, is written upon the front side of one of the principle cards and upon a series of strategy cards succeeding one of said principle cards and preceding one of the principle cards upon which a different principle word is written.

An acronym is associated with each principle word and written upon the back side of each principle card. There are a plurality of strategy words whose first letters comprise a different letter of the acronym, wherein each of the strategy words is written upon the back portion of the strategy card, and a plurality of instructional cards.

The strategy word ends in a suffix which sounds identical to each other suffix positioned on each strategy card having the same principle word positioned on its front portion. The acronym is comprised of letters represented by a first letter of the strategy word positioned on a succeeding strategy card having a principle word identical to the principle word on the front side of the principle card containing the acronym. The strategy card is comprised of a color identical to the color of the principle card preceding the strategy card. A sketch is positioned on the back portion of the strategy card which illustrates the strategy word. Explanatory text is positioned on the back portion of the strategy card wherein portions of the explanatory text are highlighted to emphasize important phrases, and directive text is positioned on the back portion of the strategy card and on the back side of the principle card.

DETAILED DESCRIPTION OF INVENTION

Figure 1:
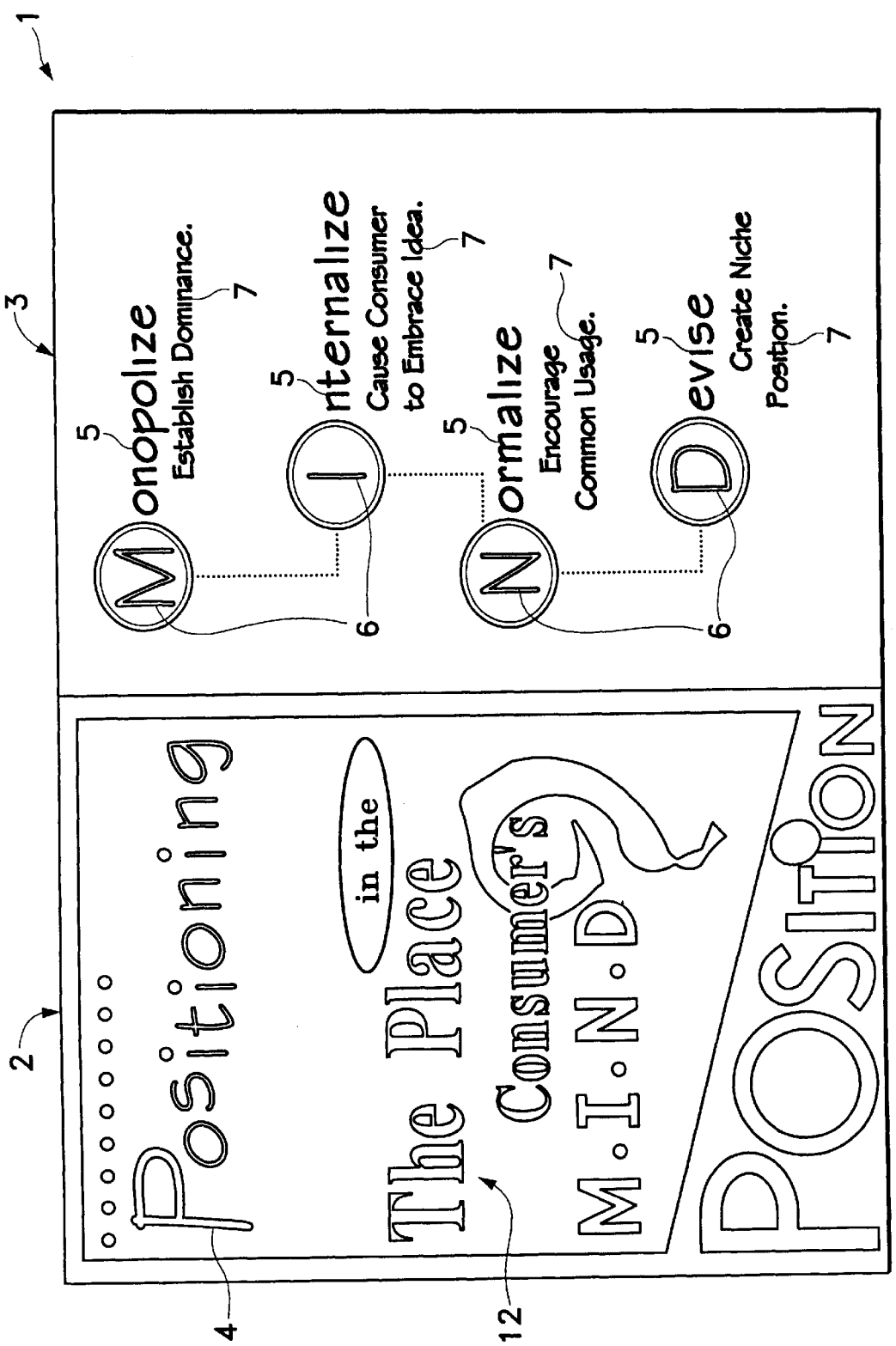
FIG. 1 is a top elevational view of a principle card 1 of the present invention.
Figure 2:
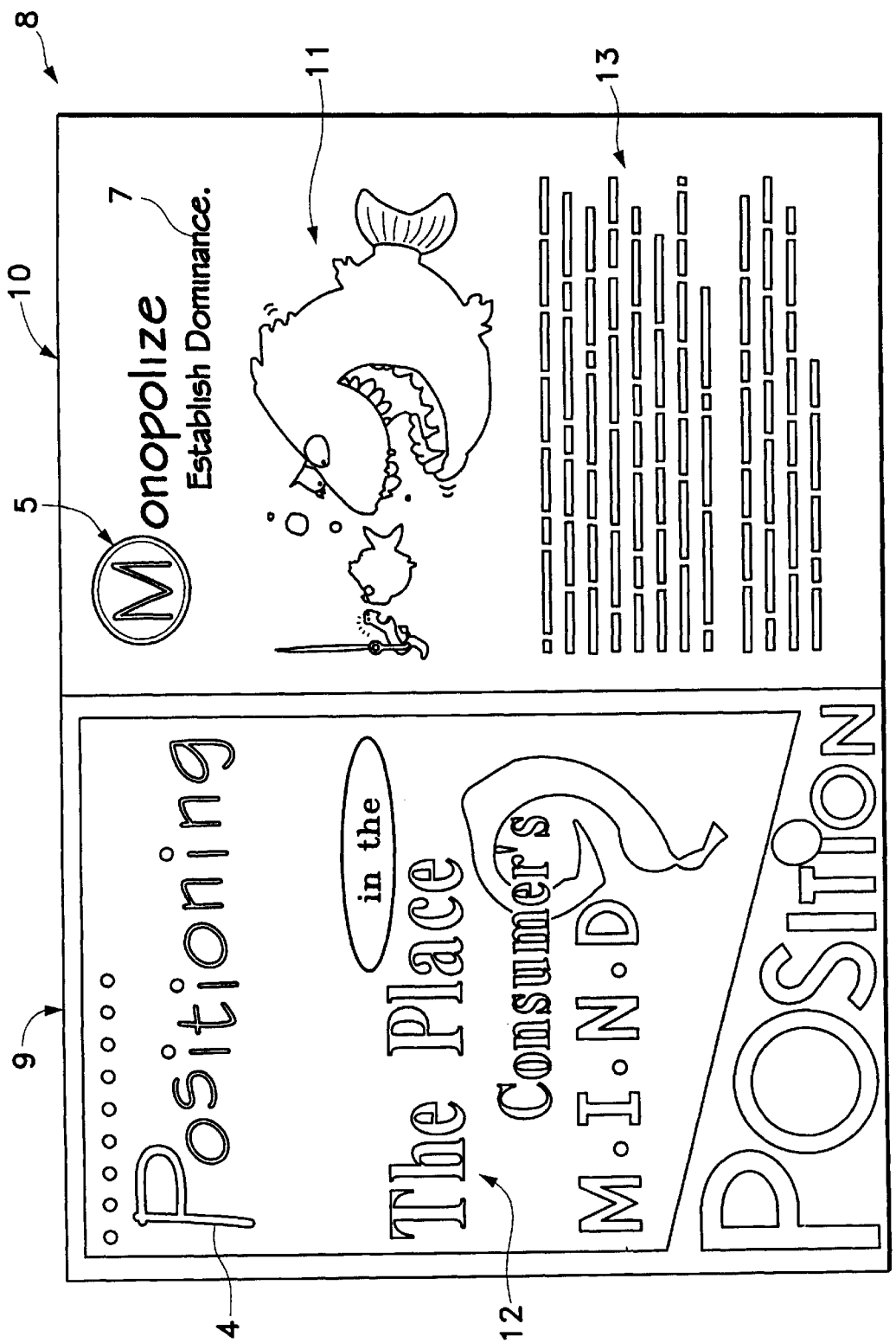
FIG. 2 is a top elevational view of a strategy card 8 of the present invention.
Figure 3:
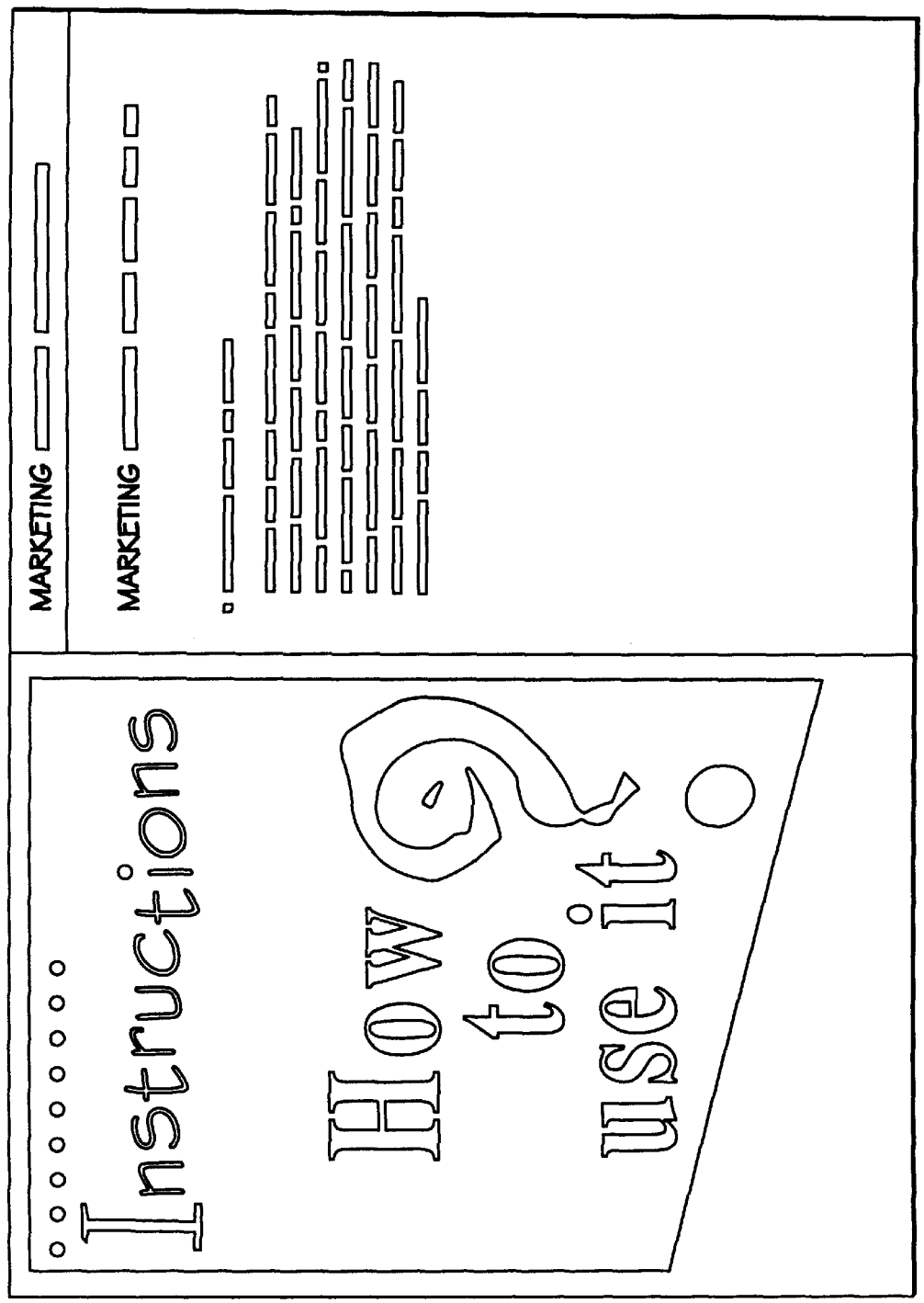
FIG. 3 is a top elevational view of an instructional card of the present invention.

Referring initially to FIGS. 1–3 of the drawings, in which like numerals indicate like elements throughout several views, in a preferred embodiment, the interactive modular educational system of the invention is generally comprised of a plurality of principle cards 1, one of which is shown in FIG. 1, having a front side 2 and a back side 3, a plurality of strategy cards 8, one of which is shown in FIG. 2, having a front portion 9 and a back portion 10, and a plurality of instructional cards 14, one of which is shown in FIG. 3.

Referring to the top elevational view of FIG. 1, a principle word 4 can be seen on the front side 2 of the principle card 1. The principle word 4, for example "Positioning" represents a principle, and phrase 12, for example "The Place in the Consumer's Mind" represents a tactic each of which are associated with an area of business such as, for example, "Marketing" which is the title of the deck. The principle word 4 and phrase 12 are repeated on a plurality of strategy cards 8, until a new principle card 1, with its new principle word 4, and phrase 12 written upon it, is reached.

Referring once again to FIG. 1 it can be seen that the back side 3 of the principle card 1 is comprised of a plurality of strategy words 5. These strategy words 5 are associated with the business discipline portrayed by the principle word 4 on the front side 2 of the principle card 1. The first letter of each strategy word is encircled and enlarged to help the user visualize each of the strategy words 5. The acronym 6 is comprised of the first letter of a strategy word 5 positioned on a succeeding strategy card 8 having the identical principle word 4 on the front side 2 of the principle card 1 containing that acronym 6. The acronym 6 is associated with the principle word 4, and is specifically designed to allow the user to easily remember it, since it is itself a word and not merely a random aggregation of letters, and to associate it with its corresponding strategy words 5. The acronym 6 is written upon each said principle card 1 that contains the principle word 4 associated with the acronym 6. Just below the strategy word 5 is directive text 7, usually two or three words which summarize and highlights the meaning represented by the strategy word 5 which directly precedes it.

Referring to the top elevational view of FIG. 2, a strategy card 8 can be seen. A plurality of strategy cards 8 are associated with the principle card 1, which precedes it in the deck. The principle word 4, and phrase 12 on the front portion 9 of the strategy card 8 is identical to the principle word 4, and phrase 12 on the front side 2 of the principle card 1 proceeding it. While the front portion 9 of each strategy card 8 within the same business discipline is identical to each other, the back portion 10 of each strategy card 8 varies.

Referring again to FIG. 2 the back portion 10 of the strategy card 8 shows one of the strategy words 5 that was shown on the back side 3 of the preceding principle card 1. Once again the first letter of the strategy word 5 is encircled and enlarged. The directive text 7 which follows directly after the strategy word 5 on the principle card 1 is repeated here, on the back portion 10 of the strategy card 8, underneath the strategy word 5 it highlights. Underneath the directive text 7 can be seen a sketch 11 which illustrates the strategy word 5 and the associated explanatory text 13. The sketch 11 on the back portion 10 of each of the strategy cards 8 is specifically designed to allow the user to easily remember the strategy word 5, associated directive text 7, and the more detailed explanatory text 13 which accompanies the sketch 11. The explanatory text 13, highlighted in certain portions to emphasize certain key phrases, accompanied by the sketch 11, is more detailed than the directive text 7 which follows immediately after the strategy word 5 and immediately before the sketch 11.

Referring once again to FIG. 1, it can be seen that each strategy word 5 that shares the same principle word 4, ends in a suffix that sounds identical to each other suffix on the strategy card 8 having the same said principle word 4 positioned on its front portion 9. This defines a section of cards, comprised of a principle card 1, and a plurality of associated strategy cards 8, all of which may be used in a modular fashion without using other cards in the deck. This is an essential feature of the present invention since a user can easily recall strategy words 5 by simply remembering the sound of the suffix and associating it with the corresponding strategy word 5. A plurality of instructional cards 14 one of which is shown in FIG. 3, are included in each deck of cards giving a brief overview of the system and describing the different methods of using the cards The interactive modular educational system as shown in the drawings is meant to be used as an educational tool for the purposes of assisting those in business to break into a field of business or to improve upon an existing business skill. The system comes with a brochure and an overview card which describe the deck, the author, and the system's advantages. The system is portable and can be viewed as a kit with the cards fitting snugly into a carrying case. The system can be used in its entirety, by using all of the cards supplied in the deck of a business discipline, Marketing, for example, or can be used in a modular fashion, by simply interchanging cards. This allows the user to improve on certain weaknesses or improve on specific strengths. It can also be used randomly, by simply picking any strategy card 8 and read about a specific business tactic. This might be valuable just before an important presentation or meeting.

In the preferred embodiment of the invention, a user can choose from one of seven business disciplines such as Marketing, Creativity, Design, Presentation, Promotion, Public Relations, and Writing. The library of disciplines can be used independently or in totality. Each business discipline is represented by one principle card 1 and a plurality of strategy cards 8. The user, by examining the principle card 1 notices the acronym 6 comprised of the first letters of each strategy word 5. This acronym is not just a random word, but a word illustrating the business discipline defined by the principle word 4 of the principle card 1. The user may then proceed to the next card, the first strategy card 8, and begin learning the first concept represented by the strategy word 5 beginning with the first letter of the acronym 6. The user then reads the text 7, and views the sketch 11. By repeating this process for the remaining strategy cards 5 associated with the principle word 4, the user learns valuable business techniques and can recall each technique by simply remembering the corresponding acronym 6. The user can jump to a different business discipline entirely, or just continue reading all of the strategy cards 5 associated with the same principle word 4, and then move on to the next principle card 1, having a new principle word 4, and learn a new concept by utilizing the same process as just described.

In addition to the use of identical sounding suffixes to help the user remember key concepts, colors are also embodied in the present invention to help distinguish various business disciplines. Each principle card 1 is represented by a specific color different from the color of a prior or succeeding principle card providing a color scheme for the purpose of allowing a user to associate a particular color with a particular principle word 4. Each strategy card 8 is represented by this same color. Therefore in any given set of cards, every strategy card 8 is represented by a color identical to the color of the principle card 1 having the identical principle word 4 written on its front side 2. This, once again, assists the user in associating key concepts within a business discipline with a specific color. If a user inadvertently rearranges the deck, and discovers that cards are not in the proper order he need only match cards having the same colors to form the complete business discipline.

Having described the invention in detail, those skilled in the art will appreciate that modifications may be made of the invention without departing from its spirit. Therefore, it is not intended that the scope of the invention be limited to the specific embodiments illustrated and described. Rather it is intended that the scope of the invention be determined by the appended claims and their equivalents.

What is claimed is:

1. An interactive modular educational system, comprising:

a plurality of principle cards, each of said principle cards having a front side and a back side;

a plurality of strategy cards, each of said strategy cards having a front portion and a back portion;

a plurality of principle words, each principle word representing a business discipline wherein each of said principle words written upon said front side of one of said principle cards and upon a series of said strategy cards succeeding said one of said principle cards and preceding one of said principle cards upon which a different principle word is written;

a plurality of phrases each of which represents a tactic, each of said phrases is written upon one of said principle cards and upon a series of said strategy cards succeeding said one of said principle cards and preceding one of said principle cards upon which a different principle word is written wherein said tactic is associated with a business area;

an acronym associated with each said principle word and written upon said back side of each of said principle cards;

a plurality of strategy words each associated with said business discipline portrayed by said principle word whose first letters comprise a different letter of said acronym, wherein each of said strategy words is written upon said back portion of said strategy card; and a plurality of instructional cards.

2. The interactive modular educational system of claim 1 wherein said strategy word ends in a suffix which sounds identical to each other said suffix positioned on each said strategy card having the same said principle word written on its said front portion thereby defining a section comprised of said principle card and said strategy cards allowing users to use said system in a modular fashion.

3. The interactive modular educational system of claim 2 wherein each said acronym is comprised of letters represented by a first letter of said strategy word positioned on a succeeding said strategy card having said principle word identical to said principle word on said front side of said principle card containing said acronym.

4. The interactive modular educational system of claim 3 wherein each said principle card is represented by a color different from said color of a prior or succeeding said principle card thereby providing a color scheme for the purpose of allowing a user to associate a particular said color with a particular said principle word.

5. The interactive modular educational system of claim 4 wherein each said strategy card is represented by said color identical to said color of said principle card having the identical said principle word written on its said front side.

6. The interactive modular educational system of claim 5 wherein said strategy card contains a sketch positioned on said back portion of said strategy card which illustrates said strategy word.

7. The interactive modular educational system of claim 6 wherein explanatory text is positioned on said back portion of said strategy card and directive text summarizing the meaning represented by said strategy word preceding it, is positioned on said back portion of said strategy card and on said back side of said principle card.

8. The interactive modular educational system of claim 7 wherein portions of said explanatory text are highlighted to emphasize important phrases.

\* \* \* \* \*